Patented Feb. 27, 1951

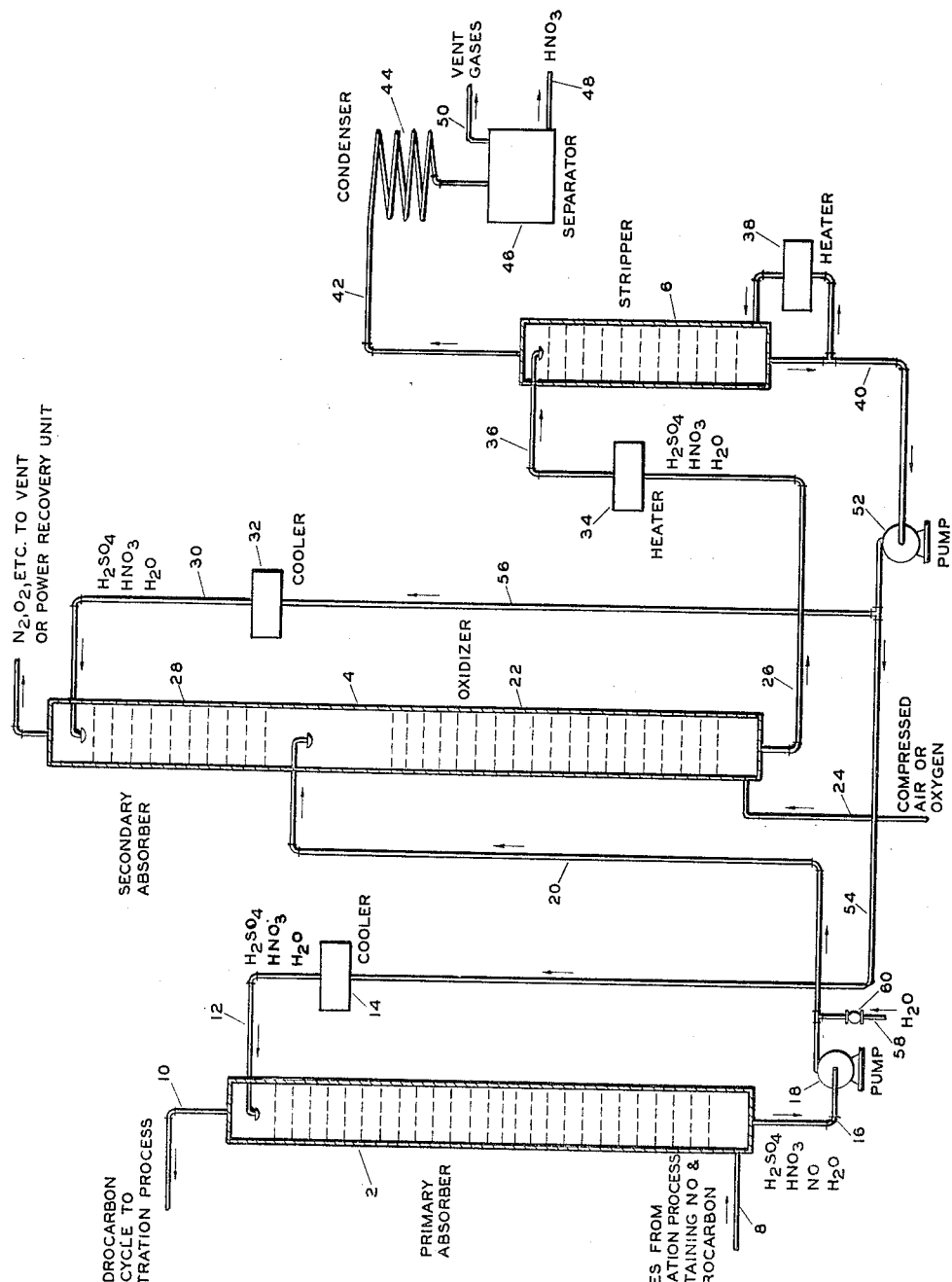

2,543,446

UNITED STATES PATENT OFFICE 2,543,446

PROCESS FOR THE RECOVERY OF NITROGEN OXIDE

Richard S. Egly, Terre Haute, Ind., assignor to Commercial Solvents Corporation, Terre Haute, Ind., a corporation of Maryland Application October 12, 1948, Serial No. 54,153

15 Claims. (Cl. 23—157)

This invention relates to a process for the production of nitric acid and more particularly to a process for the recovery of nitric oxide as nitric acid from the gaseous effluent of a vapor phase nitration process.

In the vapor phase nitration of normally gaseous hydrocarbons, such as methane, there results a gaseous effluent which comprises essentially unreacted hydrocarbons and nitric oxide (NO), the latter being present in amounts usually less than about 10 per cent by volume. The gaseous effluent may also contain small quantities of other gases, such as nitrogen, carbon monoxide and carbon dioxide. In order for the nitration process to be commercially feasible, it is desirable that substantially all of the nitric oxide be recovered and that the normally gaseous hydrocarbon be recycled to the nitration zone without substantial dilution with extraneous gases. The nitration process itself is one which is well known in the art and is ordinarily carried out at elevated temperatures and under superatmospheric pressure, for example, 100 pounds per square inch. In the treatment of the effluent gas from a nitration process, the step of separating the nitric oxide from the normally gaseous hydrocarbon is complicated by the fact that the nitric oxide is present in the effluent gas in relatively small amounts, that is, less than about 10 per cent by volume. For this reason it has been difficult to separate and recover substantially all of the nitric oxide and to recycle to the nitration process a substantially undiluted hydrocarbon gas from which the nitric oxide has been substantially completely removed.

It is well known in the art that oxides of nitrogen may be absorbed under certain conditions by concentrated sulfuric acid. However, the use of concentrated sulfuric acid in a nitric oxide recovery process has not been commercially feasible since the nitric oxide cannot readily be separated from the sulfuric acid to permit the sulfuric acid to be reused in an absorption step. However, a solution comprising sulfuric acid, water and nitric acid may be used for this purpose. Such a solution is particularly effective for selectively absorbing nitric oxide from a gas containing nitric oxide and a relatively large proportion of an inert gas such as methane. It is believed that the absorption step involves the following chemical reaction:

$$2NO + 3H_2SO_4 + HNO_3 \rightleftarrows 3NOHSO_4 + 2H_2O \quad (I)$$

When the resulting solution containing the absorbed nitric oxide, which in accordance with equation I is believed to be present as nitrosylsulfuric acid, is oxidized by an oxygen-containing gas, additional quantities of nitric acid are formed in the solution with the corresponding disappearance of nitric oxide or nitrosylsulfuric acid. The chemical reaction involved in the oxidizing step is believed to be represented by the following equation:

$$3NOHSO_4 + \tfrac{3}{2}O_2 + 3H_2O \rightarrow 3HNO_3 + 3H_2SO_4 \quad (II)$$

Combining equations I and II, it will be noted that the over-all absorption-oxidation reaction may be represented as follows:

$$2NO + \tfrac{3}{2}O_2 + H_2O \rightarrow 2HNO_3 \quad (III)$$

It will be observed from equation III that in the combined absorption-oxidation process 2 moles of nitric oxide are oxidized to 2 moles of nitric acid thereby increasing the over-all concentration of nitric acid in the absorbing solution. From a consideration of equation I it will be noted that some nitric acid is required in the original absorption solution to result in the formation of the nitrosylsulfuric acid. Because of the fact that nitric acid is produced in the absorption-oxidation reaction, it is desired that a portion of the nitric acid be removed from the oxidized solution and the solution then recycled to the absorption step, thereby providing a continuous operation. This partial removal of nitric acid may be effected by a distillation operation.

Further consideration of the above indicated equations will also reveal that there is an over-all consumption of water in the absorption-oxidation process and accordingly it is necessary that water be added periodically to the system in order to maintain the required percentage of water in the absorption solution. The water thus added from time to time also serves to compensate for such water as may be lost during distillation in the nitric acid recovery step.

In the oxidation step the nitric oxide-enriched solution is treated with an oxygen-containing gas which may be air or pure oxygen to oxidize the nitrosylsulfuric acid to form a mixture of nitric acid and sulfuric acid. During this treatment the oxygen-containing gas is intimately contacted with the solution in countercurrent flow relationship and it has been found that during this oxidation step a portion of the nitric oxide is desorbed, as such or as nitrogen dioxide, from the solution prior to the time that it is oxidized to nitric acid. Thus desorbed nitric oxide and other oxides of nitrogen may be found in the vent gases escaping from the oxidizing zone. In certain cases, particularly where air is employed as the oxidizing agent, the amount of oxides of nitrogen which may escape from the oxidizing zone may be considerable. Accordingly, it is an object of this invention to provide means for the recovery of any oxides of nitrogen that may escape from the oxidizing zone in a process of the character indicated.

A further object of this invention is to provide a process for the preparation of nitric acid from gases containing nitric oxide involving an oxidizing step wherein substantially all of the oxides of nitrogen treated or formed in the process are recovered as nitric acid.

A further object of this invention is the provision of an improved continuous method for the recovery of nitric oxide as nitric acid from the effluent gas of the hydrocarbon nitration process.

A still further object of this invention is the provision of a process for removing nitric oxide from a mixture of nitric oxide and a normally gaseous hydrocarbon, such as methane, wherein the normally gaseous hydrocarbon is not substantially diluted by extraneous gaseous materials and wherein substantially all of the nitric oxide is recovered as nitric acid.

Further and additional objects of this invention will appear from the following description, the accompanying drawing and the appended claims.

In accordance with one embodiment of this invention, nitric oxide is absorbed from a gas containing the same by contacting the gas with a solution comprising essentially sulfuric acid, water and nitric acid. The resulting nitric oxide-enriched solution is then contacted with an oxygen-containing gas, such as air or pure oxygen, whereby the nitric oxide is oxidized to nitric acid and whereby a gas is liberated from the oxidizing zone which unavoidably may contain gaseous oxides of nitrogen, such as nitric oxide or nitrogen dioxide. These oxides of nitrogen are liberated from the solution by desorption during treatment with the oxygen-containing gas prior to the time that complete oxidation thereof to nitric acid has been effected. In accordance with this invention, the gases containing these oxides of nitrogen are contacted in a second absorption zone with a solution containing sulfuric acid, water and nitric acid whereby to remove substantially all of the oxides of nitrogen. This last-mentioned solution is then passed directly to the oxidizing zone whereby the absorbed oxides of nitrogen are converted to nitric acid. Combined solutions enriched in nitric acid are withdrawn from the oxidizing zone for the recovery of excess quantities of nitric acid contained therein. In accordance with a preferred embodiment of this invention, the recovery of nitric acid may be effected by passing the enriched solution from the oxidizing zone to a stripping zone wherein a portion of the nitric acid is distilled from the solution. The residue from the distillation step still containing a substantial proportion of nitric acid is then divided into two streams which are recycled, respectively, to the first absorption zone and to the second absorption zone.

For a more complete understanding of this invention, reference will now be made to the drawing which is a schematic showing of one form of apparatus wherein the process may be carried out. However, it will readily be apparent that this particular modification may be widely varied without departing from the spirit and scope of this invention as defined in the appended claims.

With particular reference to the drawing, there is provided a primary absorber 2, a combined absorber and oxidizer 4, and a stripper 6, each of which may comprise towers that are well known in the art for the absorption or other treatment of gases with liquids. Bubble towers or packed columns suitable for contacting gases with strongly acid solutions may be employed.

In accordance with this invention, an effluent gas and from a nitration process containing essentially nitric oxide (in an amount less than about 10 per cent by volume) and a normally gaseous hydrocarbon, such as methane, together with small amounts of nitrogen, carbon monoxide and carbon dioxide, are passed into the bottom of the absorber 2 through line 8. (Ordinarily the gases so introduced are under a pressure of about 100 pounds per square inch which corresponds to the pressure obtaining in the nitration zone.) Unabsorbed gases comprising essentially normally gaseous hydrocarbons, such as methane, are withdrawn from the top of the absorber 2 through line 10 and are preferably recycled to the nitration process. Into the top of absorber 2 through line 12 is introduced a solution which may comprise essentially about 45 weight per cent sulfuric acid, about 44 weight per cent water and about 11 weight per cent nitric acid. In order that this solution may effectively absorb the nitric oxide in the absorber 2 and may effectively be treated in the oxidizing zone as hereinafter described, the proportion of ingredients in the solution preferably falls within the range of about 40 to about 50 weight per cent of sulfuric acid, about 35 to about 45 weight per cent of water and about 5 to about 25 weight per cent of nitric acid.

The solution introduced into the absorber through line 12 is preferably cooled in a suitable cooler 14 so that the absorber will be maintained at a temperature effective for the efficient absorption of the nitric oxide in the solution. The solution flows downwardly through the absorber 2 in countercurrent intimate direct contact with the upwardly flowing gases introduced through line 8. The height of the absorber 2 is chosen so that substantially all of the nitric oxide contained in the gaseous mixture is absorbed in the solution by the time the gas reaches the top of the absorber. The temperature of the solution within the absorber should be maintained at a value below about 35° C. in order to obtain efficient absorption of the nitric oxide. If desired, the temperature of the absorber may be as low as the freezing point of the solution passing therethrough. However, economic considerations will usually dictate that the temperature of the absorber be maintained at or above about 15° C.

The absorbing solution containing the nitric oxide (presumably as nitrosylsulfuric acid) is withdrawn from the lower portion of the absorber 2 through line 16, and passed through pump 18 and line 20, into an intermediate section of the combined absorber-oxidizer tower 4. Make-up water may be added as required, to the solution in line 20, through line 58, controlled by valve 60. The solution is allowed to flow downwardly through a lower oxidizing zone 22 in the tower in countercurrent flow relationship with a stream of compressed air or oxygen introduced into the bottom of the tower 4 through line 24. The oxygen intimately contacts the nitric oxide-enriched solution in the oxidizing zone 22 whereby the oxygen and water within the solution react with the absorbed nitric oxide to form additional quantities of nitric acid in the solution. The nitric acid-enriched solution is withdrawn from the bottom of the tower 4 through line 26.

During the oxidation step within the zone 22 a portion of the nitric oxide and other oxides of nitrogen may be desorbed from the solution passing through the oxidizing zone and are liberated and escape to an upper secondary absorbing zone 28 of the tower 4. It is desired that these oxides of nitrogen be recovered and in accordance with this invention this is effected by introducing into the top of the tower 4 above the secondary absorbing zone 28 a solution comprising sulfuric acid, water and nitric acid. This solution is introduced through line 30, having been pre-cooled in a cooler 32. Thus the gases escaping from the oxidizing zone 22 a solution comprising sulfuric acid, absorbing solution in the secondary absorbing zone 28. The resulting solution which has been enriched in oxides of nitrogen passes downwardly from the secondary absorbing zone 28 directly to the oxidizing zone 22 wherein the absorbed oxides of nitrogen therein are oxidized to nitric acid in the manner previously indicated for the commingled solution introduced through line 20. It will be apparent that some oxidation of absorbed oxides of nitrogen may take place in the secondary absorbing zone 28 by virtue of any unreacted oxygen that may pass upwardly therethrough from the oxidizing zone 22.

The cooler 32 is regulated so that the temperature in both the secondary absorbing zone 28 and the oxidizing zone 22 is below about 40° C. and preferably between about 20° and 40° C.

The nitric acid-enriched solution is withdrawn from the bottom of tower 4 through line 26 and is passed to a heater 34 in which the temperature of the solution is raised to between 50° and 150° C., suitably about 100° C. The heated solution is then passed through line 36 into the top of the stripper 6 in which a portion of the nitric acid is distilled from the solution. This distillation is effected at any desired temperature below the decomposition temperature of nitric acid and preferably between about 50° and 150° C., suitably 100° C. The temperature within the stripper 6 is maintained by the heater 34 and recirculation of solution through a heater 38 adjacent the bottom of the stripper.

The distillation of nitric acid in the stripper 6 is controlled by adjusting the temperature, pressure and flow rates so that only a portion of the nitric acid is stripped from the solution passing therethrough and so that the solution discharged from the bottom thereof through line 40 will have substantially the ratio of sulfuric acid, water and nitric acid that is desired in the solutions introduced into the top of the absorber 2 and into the top of the secondary absorbing zone 28. Preferably the nitric acid content of the solution withdrawn through line 40 should be in excess of about 5 weight per cent, but not in excess of about 25 weight per cent.

Nitric acid vapors pass from the top of stripper 6 through line 42 and condenser 44 to a separator 46. Nitric acid may be withdrawn from the separator through line 48 as required and any vent gases may escape through line 50. If desired, valves (not shown) may be provided in lines 48 and 50 to maintain any desired superatmospheric pressure on the system.

The stripped solution containing sulfuric acid, water and nitric acid is passed from the bottom of the stripper 6 through line 40 and pump 52. The stream from pump 52 is divided into two portions and one portion is passed through line 54, cooler 14 and line 12 to the top of absorber 2 and the other portion is passed through line 56, cooler 32 and line 30 to the top of the secondary absorbing zone 28, all as above described.

It will be apparent from the foregoing description that a continuous cyclic process has been provided for removing nitric oxide from a gas containing mixtures of the same. The process specifically disclosed above is particularly useful in the recovery of effluent gases from a hydrocarbon nitration process wherein it is desired to recycle the hydrocarbons to the nitration step without substantial dilution by other gases. The hydrocarbon may be any normally gaseous hydrocarbon of the methane series, such as methane, ethane, propane, etc. It will be noted that the secondary absorber zone 28 and the oxidizing zone 22 have been combined in a single tower 4 in the modification shown. However, it will readily be apparent to one skilled in the art that these zones may be located in separate towers if desired. It will, of course, also be apparent that additional towers may be employed, arranged either in series or in parallel, as may be necessary, for effecting the substantially complete removal of nitric oxide from the initial gases being treated, for the substantially complete oxidation of the nitric oxide and other oxides of nitrogen in the solution undergoing oxidation in the oxidizing zone, and for the absorption of oxides of nitrogen in the secondary absorbing zone.

As previously indicated, the concentrations of sulfuric acid and nitric acid within the ranges above specified permit the ready absorption of the nitric oxide and the other oxides of nitrogen in the primary and secondary absorbing zones. The concentration of the water when adjusted within the range specified will permit the oxides of nitrogen to be readily converted to nitric acid in the oxidizing zone. If the weight per cent of water is greatly increased beyond the range above indicated, then the power of the solution to absorb nitric oxide is decreased. On the other hand, if less water is present in the solution, then the ability of the solution to become desorbed of nitric oxide (by oxidation to nitric acid) is markedly diminished.

The pressures employed in the absorption zones and in the oxidizing zone may be atmospheric or superatmospheric. Ordinarily superatmospheric pressures corresponding to the pressure in a hydrocarbon nitration zone will be employed. This is particularly desirable in the absorption zones since the rate of absorption is increased by increase in pressure. As is well recognized in the art, such pressure may correspond to about 100 pounds per square inch. Likewise increased pressure in the oxidizing zone is desirable because of the tendency of increased pressures to promote the oxidation reaction. If pure oxygen is introduced into the oxidizing zone as the oxidizing gas, then the pressure may be somewhat reduced over the pressure desired if air is employed as the oxidizing gas.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A process for the production of nitric acid which comprises contacting in a first zone a gas containing nitric oxide with a solution comprising sulfuric acid, water and nitric acid whereby nitric oxide is absorbed in said solution; contacting in a second zone the solution from said first zone with an oxygen-containing gas whereby an additional amount of nitric acid is formed in said solution and a gas containing oxides of nitrogen is liberated; contacting in a third zone the gas liberated from said second zone with a solution comprising sulfuric acid, water and nitric acid whereby said oxides of nitrogen are absorbed; passing the solution from said third zone to said second zone for oxidation of absorbed oxides of nitrogen therein to nitric acid; and withdrawing nitric acid-enriched solution from said second zone.

2. The process recited in claim 1 wherein the contact solutions for the first and third zone comprise essentially about 40 to about 50 weight per cent of sulfuric acid, about 35 to about 45 weight per cent of water, and about 5 to about 25 weight per cent of nitric acid.

3. A process for the production of nitric acid which comprises contacting in a first zone a gas containing nitric oxide with a solution comprising sulfuric acid, water and nitric acid whereby nitric oxide is absorbed in said solution; contacting in a second zone the solution from said first zone with an oxygen-containing gas whereby an additional amount of nitric acid is formed in said solution and a gas containing oxides of nitrogen is liberated; contacting in a third zone the gas liberated from said second zone with a solution comprising sulfuric acid, water and nitric acid whereby said oxides of nitrogen are absorbed; passing the solution from said third zone to said second zone for oxidation of absorbed oxides of nitrogen therein to nitric acid; withdrawing nitric acid-enriched solution from said second zone and passing it to a fourth zone; distilling at least a portion of said nitric acid from said enriched solution in said fourth zone; and recovering the nitric acid so distilled.

4. A process for the production of nitric acid which comprises contacting in a first zone a gas containing nitric oxide with a solution comprising sulfuric acid, water and nitric acid whereby nitric oxide is absorbed in said solution; contacting in a second zone the solution from said first zone with an oxygen-containing gas whereby an additional amount of nitric acid is formed in said solution and a gas containing oxides of nitrogen is liberated; contacting in a third zone the gas liberated from said second zone with a solution comprising sulfuric acid, water and nitric acid whereby said oxides of nitrogen are absorbed; passing the solution from said third zone to said second zone for oxidation of absorbed oxides of nitrogen therein to nitric acid; withdrawing nitric acid-enriched solution from said second zone and passing it to a fourth zone; distilling a portion of said nitric acid from said enriched solution in said fourth zone; recovering the nitric acid so distilled; and recycling portions of the residue from said distillation to the first zone and to the third zone as the contact solutions therefor.

5. The process recited in claim 4 wherein said recycle residue comprises essentially about 40 to about 50 weight per cent of sulfuric acid, about 35 to about 45 weight per cent of water, and about 5 to about 25 weight per cent of nitric acid and wherein make-up water is added to the system during the process in amounts to maintain the water percentage within the range specified.

6. A continuous process for the production of nitric acid which comprises passing a gas containing nitric oxide into a first absorption zone maintained at a temperature below about 35° C. into contact with a portion of a first solution comprising essentially about 40 to about 50 weight per cent of sulfuric acid, about 35 to about 45 weight per cent of water, and about 5 to about 25 weight per cent of nitric acid whereby to absorb a substantial proportion of said nitric oxide; passing the resulting solution to an oxidizing zone maintained at a temperature below about 40° C.; contacting said resulting solution in said oxidizing zone with an oxygen-containing gas whereby an additional amount of nitric acid is formed in said solution and a gas containing oxides of nitrogen is liberated; contacting in a second absorption zone also maintained at a temperature below about 40° C. the gas liberated from said oxidizing zone with another portion of said first solution whereby said oxides of nitrogen are absorbed; passing the resulting solution from said second absorption zone to said oxidizing zone for oxidation of absorbed oxides of nitrogen therein to nitric acid; withdrawing nitric acid-enriched solution from said oxidizing zone to a stripping zone; distilling of portion of said nitric acid from said enriched solution in said stripping zone at a temperature between about 50° C. and about 150° C. to reduce the nitric acid content thereof to a value not less than about 5 weight per cent; recovering the nitric acid so distilled; recycling portions of the residue solution from the stripping zone to the first absorption zone and the second absorption zone; and adding make-up water to the system in amounts to maintain the water percentage within the range specified.

7. In a process for the recovery of nitric oxide as nitric acid from a gaseous mixture comprising an inert gas and less than about 10 per cent by volume of nitric oxide wherein said gaseous mixture is contacted with a solution whereby selectively to absorb a substantial proportion of the nitric oxide from said gaseous mixture, wherein the resulting solution is contacted in an oxidizing zone with an oxygen-containing gas whereby an additional amount of nitric acid is formed together with a gaseous effluent containing oxides of nitrogen, and wherein a portion of said nitric acid is ultimately recovered from the nitric acid-enriched solution; the steps of contacting said gaseous effluent with a solution comprising essentially sulfuric acid, water and nitric acid whereby to absorb said oxides of nitrogen, and of introducing the resulting solution into said oxidizing zone.

8. The process recited in claim 7 wherein the first mentioned solution and the gaseous effluent contacting solution each have a composition falling within the range of about 40 to about 50 weight per cent of sulfuric acid, about 35 to about 45 weight per cent of water, and about 5 to about 25 weight per cent of nitric acid.

9. A process for the recovery of nitric oxide as nitric acid from a gaseous mixture comprising an inert gas and less than about 10 per cent by volume of nitric oxide which comprises scrubbing said gaseous mixture in a first zone with a solution of sulfuric acid, water and nitric acid, whereby selectively to absorb a substantial proportion of the nitric oxide from said gaseous mixture, intimately contacting the resulting solution in a second zone with an oxygen-containing gas whereby an additional amount of nitric acid is formed in the solution and a gaseous effluent containing oxides of nitrogen is formed, scrubbing said gaseous effluent in a third zone with a solution of sulfuric acid, water and nitric acid whereby selectively to absorb a substantial proportion of the oxides of nitrogen, introducing the enriched solution from the third zone to the second zone for further oxidation, and withdrawing from said second zone a solution enriched in nitric acid.

10. The process recited in claim 9 wherein the scrubbing solutions in the first and third zones comprise essentially about 40 to about 50 weight per cent of sulfuric acid, about 35 to about 45 weight per cent of water, and about 5 to about 25 weight per cent of nitric acid.

11. The process recited in claim 9 wherein the inert gas in said gaseous mixture comprises essentially a normally gaseous hydrocarbon.

12. A process for the recovery of nitric oxide as nitric acid from a gaseous mixture comprising an inert gas and less than about 10 per cent by volume of nitric oxide which comprises scrubbing said gaseous mixture in a first zone with a solution of sulfuric acid, water and nitric acid, whereby selectively to absorb a substantial proportion of the nitric oxide from said gaseous mixture, intimately contacting the resulting solution in a second zone with an oxygen-containing gas whereby an additional amount of nitric acid is formed in the solution and a gaseous effluent containing oxides of nitrogen is formed, scrubbing said gaseous effluent in a third zone with a solution of sulfuric acid, water and nitric acid whereby selectively to absorb a substantial proportion of the oxides of nitrogen, introducing the enriched solution from the third zone to the second zone for further oxidation, withdrawing from said second zone the nitric acid-enriched solution and introducing it into a stripping zone, distilling only a portion of said nitric acid from said nitric acid-enriched solution in said stripping zone, recovering the nitric acid so distilled, and recycling the residue solution from the stripping zone to said first and third scrubbing zones.

13. A continuous process for the recovery of nitric oxide as nitric acid from a gaseous mixture comprising an inert gas and less than about 10 per cent by volume of nitric oxide which comprises passing said gaseous mixture through a nitric oxide absorption zone in countercurrent flow relationship and in intimate contact with an absorbing solution comprising essentially about 40 to about 50 weight percent of sulfuric acid, about 35 to about 45 weight per cent of water, and about 5 to about 25 weight per cent of nitric acid, said solution in said absorption zone being maintained at a temperature below about 35° C.; continuously passing the nitric oxide-enriched solution from said absorption zone to an oxidizing zone wherein the temperature of the solution therein is maintained below about 40° C.; passing an oxygen-containing gas through said oxidizing zone in countercurrent flow relationship and in intimate contact with said solution whereby an additional amount of nitric acid is formed in said solution and a gas is liberated containing oxides of nitrogen; continuously passing said last mentioned gases through a second absorption zone in countercurrent flow relationship and in intimate contact with an absorbing solution having the composition of that previously defined whereby oxides of nitrogen are absorbed therein; continuously passing the enriched solution from the second absorption zone concurrently with the nitric oxide-enriched solution from the first-mentioned absorption zone through said oxidizing zone; continuously passing the solution from said oxidizing zone to a stripping zone; distilling the solution in the stripping zone at a temperature between about 50° C. and about 150° C. to reduce the nitric acid content of the solution to a value not below about 5 weight per cent; recovering the nitric acid so distilled; recycling portions of the residue solution from the stripping zone to the first absorption zone and the second absorption zone; and adding make-up water to the system in amounts to maintain the water percentage within the range specified.

14. A process for the treatment of a gaseous effluent from a hydrocarbon nitration process, said effluent comprising essentially a normally gaseous hydrocarbon and less than about 10 volume per cent of nitric oxide, which comprises contacting said effluent with a solution comprising sulfuric acid, water and nitric acid in a first absorption zone whereby nitric oxide is absorbed in said solution; withdrawing unabsorbed gaseous hydrocarbon from said first absorption zone without substantial dilution for recycle to the nitration process; passing nitric oxide-enriched solution from said first absorption zone to an oxidizing zone wherein said solution is oxidized to form additional amounts of nitric acid therein and wherein a gas containing oxides of nitrogen is liberated; contacting in a second absorption zone the gas liberated from said oxidizing zone with a solution comprising sulfuric acid, water and nitric acid whereby said oxides of nitrogen are absorbed; passing the enriched solution from said second absorption zone to said oxidizing zone for oxidation of absorbed oxides of nitrogen therein to nitric acid; withdrawing nitric acid-enriched solution from said oxidizing zone and passing it to a stripping zone; distilling a portion of said nitric acid from said last-mentioned solution in said stripping zone; recovering the nitric acid so distilled; and recycling portions of the residue from said distillation to the first and second absorption zones as the contact solutions therefor.

15. The process recited in claim 14 wherein the contact solutions comprise essentially about 40 to about 50 weight per cent of sulfuric acid, about 35 to about 45 weight per cent of water, and about 5 to about 25 weight per cent of nitric acid.

RICHARD S. EGLY.

REFERENCES CITED

The following references are of record in the file of this patent:

UNITED STATES PATENTS

| Number | Name | Date |
|---|---|---|
| 892,516 | Halvarsen | July 7, 1908 |
| 1,120,436 | Bergfeld | Dec. 8, 1914 |
| 1,264,512 | Hechenbleickner | Apr. 30, 1918 |
| 1,474,647 | Siebert | Nov. 20, 1923 |
| 1,756,532 | Battegay | Apr. 29, 1930 |
| 2,053,834 | Kachkaroff et al. | Sept. 8, 1936 |
| 2,346,441 | Lippincott | Apr. 11, 1944 |

FOREIGN PATENTS

| Number | Country | Date |
|---|---|---|
| 156,799 | Great Britain | May 8, 1922 |

Certificate of Correction

February 27, 1951

Patent No. 2,543,446

RICHARD S. EGLY

It is hereby certified that error appears in the printed specification of the above numbered patent requiring correction as follows:

Column 1, line 20, for "niration" read *nitration*; column 4, line 12, after the word "gas" strike out "and"; line 57, for "ecenomic" read *economic*; column 5, line 18, after "zone" strike out "28 a solution comprising sulfuric acid," and insert instead *22 are intimately contacted with a fresh*;

and that the said Letters Patent should be read as corrected above, so that the same may conform to the record of the case in the Patent Office.

Signed and sealed this 10th day of July, A. D. 1951.

[SEAL]

ERNEST F. KLINGE,
*Assistant Commissioner of Patents.*